United States Patent Office 2,905,670
Patented Sept. 22, 1959

2,905,670
PHENYL-ALKYLAMINES

Karl Kindler, Hamburg, and Herbert Oelschläger, Wentorf a.W., Germany, assignors to Chemische Fabrik Promonta G.m.b.H., Hamburg, Germany No Drawing. Application November 15, 1955
Serial No. 547,020

Claims priority, application Germany November 15, 1954

7 Claims. (Cl. 260—247.7)

This invention relates to novel and improved derivatives of phenyl-alkylamines and it has particular relation to phenyl-alkylamines which have a carbon chain of at least two carbon atoms between the phenyl and amine group and are substituted in the benzene radical by an alkoxymethyl group, or an aroxymethyl group, or an aralkoxymethyl group. The invention also relates to a process for preparing the phenyl-alkylamines of the beforementioned structure.

The new compounds embodying the present invention are therapeutically useful products and can be used, for example, for local anesthesia.

The compounds of the invention correspond to the following general formula:

$$R-O.CH_2.C_6H_4(CH_2)_n-X$$

In the above formula R stands for a radical selected from the group consisting of alkyl-, aryl-, or aralkyl radicals. X stands for the amine radical and $n$ is an integer which meets the condition $n>1$. No convenient process having good yields, has been hitherto known for the preparation of such amino ethers.

In order to prepare the compounds of the invention, dichlorides of the formula $Cl.CH_2.C_6H_4(CH_2)_nCl$, which can be easily and successfully prepared by chloromethylation of phenyl-alkylchlorides of the formula $$C_6H_5(CH_2)_nCl$$

are first reacted with alkalialcoholates, of alkaliphenolates to form compounds of the formula $$R-O.CH_2.C_6H_4(CH_2)_n-Cl$$

and the Cl atom of these compounds is then substituted by an amine radical according to conventional methods. As alcoholates, for example the sodium compounds of primary, secondary or tertiary aliphatic alcohols, aliphatic-aromatic alcohols and alkoxy-alcohols, can be used in this procedure. For example, ethyl alcohol, isopropyl alcohol, tertiary butyl alcohol, benzyl alcohol and ethoxy ethyl alcohol have been found to satisfactorily react as sodium alcoholates. Alcohols of high molecular weight, as well as unsaturated alcohols, such as n-hexyl alcohol, n-octyl alcohol, and allyl alcohol, likewise normally react as sodium alcoholates. From the group of cyclic and heterocyclic alcohols, e.g. cyclohexanol and tetrahydrofurfuryl alcohol were used.

From the group of phenolates, the sodium compound of phenol proper, as well as the sodium compounds of its derivatives, which are substituted either by electronegative radicals, such as —NO$_2$, —Cl, —Br, or by electropositive radicals, e.g. methyl-, isopropyl- or alkoxy groups, can be used.

In the reactions with members of the phenol series, by way of example, the sodium compounds of the following aromatic hydroxyl-containing compounds were used: phenol, p-nitrophenol, 2-chlorophenol, 4-chlorophenol, 2,4-dichlorophenol, 2-bromophenol, 4 - bromophenol, 3-methyl-4-chlorophenol, 2-methyl phenol, 3 - methyl phenol, 4-methyl phenol, thymol, 3-methoxy phenol, and β-naphthol.

The following examples describe some embodiments and best modes of carrying out the invention, to which the invention is not limited.

*Preparation of 4-(chloromethyl)-β-phenyl-ethyl chloride*

A mixture of 703 parts of β-phenyl ethyl chloride, 75 parts of paraformaldehyde and 75 parts of anhydrous zinc chloride are vigorously stirred for about 45 minutes under heating to 50° C. in a flask. Subsequently, the reaction mixture is cooled to 30° C. and quickly saturated under strong centrifuging with dried HCl. Care is taken by cooling to prevent the reaction temperature from exceeding 45° C. After saturation, the reaction mixture is allowed to cool under stirring in a weak current of HCl. The contents of the flask is now thoroughly shaken with petroleum ether in a separating funnel and the aqueous layer is removed. The layer of petroleum ether is washed successively with water, NaHCO$_3$ solution and again with water, dried over calcium chloride, the petroleum ether is distilled off and the resulting residue is subjected to fractional distillation. In the first runnings unchanged β-phenyl ethyl chloride is recovered. In addition, 326 parts of 4-(chloromethyl)-β-phenyl ethyl chloride having a boiling point$_{25}$=158–160° C. are obtained. The yield amounts to 75% of the theory, calculated on the reacted amount of β-phenyl ethyl chloride.

*Preparation of 4-(chloromethyl)-γ-phenol propyl chloride*

A mixture of 773 parts of γ-phenyl propyl chloride, 75 parts paraformaldehyde and 75 parts of anhydrous zinc chloride, is treated by heating to 40° C. under stirring, cooling, treatment with dried HCl, subsequent treatment with petroleum ether in a separating funnel, separation and washing of the layer of petroleum ether, distilling off the petroleum ether and fractional distillation of the residue, in a manner analogous to that described in the preceding paragraph in connection with the preparation of 4-(chloromethyl)-β-phenyl ethyl chloride. 389 parts of 4-(chloromethyl)-γ-phenyl propyl chloride having a boiling point$_{24}$=176–178° C. are thus obtained. The yield, calculated on the amount of the reacted γ-phenyl propyl chloride, amounts to 80% of the theory.

*Preparation of 4-(chloromethyl)-δ-phenyl-butyl chloride*

A mixture of 68 parts of δ-phenylbutyl chloride, 6 parts of paraformaldehyde and 4 parts of anhydrous zinc chloride is vigorously stirred for 30 minutes, while heated to 50° C. The reaction mixture is then quickly saturated under vigorous centrifuging with dry HCl and the reaction temperature is prevented by cooling from exceeding 60° C. After saturation the reaction mixture is allowed to cool under stirring in a weak current of HCl. Further processing is carried out in the manner described above in connection with the preparation of 4-(chloromethyl)-β-phenyl-ethyl chloride. The yield of 4-(chloromethyl)-δ-phenylbutyl chloride amounts to 79% of the theory, based on the reacted δ-phenylbutyl chloride. Boiling point$_{11}$=169–171° C.

*Preparation of N-[4-(ethoxymethyl)-γ-phenyl-propyl]-morpholine*

2.3 parts of sodium are dissolved in 50 parts of absolute ethanol. To this solution 24 parts of 4-(chloromethyl)-γ-phenyl-propyl chloride are added and the solution is stirred under reflux at 80° C. for 8 hours. The solution is filtered with suction from the separated sodium chloride, the excess ethanol is removed by evaporation and the residue subjected to fractional distillation. The 4-(ethoxymethyl)-γ-phenyl-propyl chloride thus formed boils at 172°–173° C. (20 Torr). The yield amounts to 93% of the theory.

10 parts of the ether thus obtained are heated with 18 parts of morpholine under reflux for 24 hours and occasional stirring to 130° C. and then allowed to cool. After cooling, the reaction mass is mixed with an excess of hydrochloric acid and shaken once or twice with ether. The acid solution is then rendered alkaline, the amine is extracted and the extracted amine is subjected to fractional distillation. The N-[4-(ethoxymethyl)-γ-phenyl-propyl]-morpholine boils in the range of 162°–164° C. (0.4 Torr) and the yield amounts to 79% of the theory.

In an analogous manner, for example the following 4-(alkoxymethyl)-phenyl alkamines can be prepared with yields of 80 to 90% of the theory.

*Preparation of N-[4-(isopropoxymethyl)-γ-phenyl-propyl]-piperidine*

2.3 parts of sodium are dissolved under warming in 100 parts of absolute isopropanol. 24 parts of 4-(chloromethyl)-γ-phenyl-propyl chloride are then added and the reaction mixture is stirred under reflux at 80° C. for 14 hours. Further processing in the manner described above in connection with the preparation of N-[4-(ethoxymethyl)-γ-phenyl-propyl]-morpholine yields 4-(isopropoxymethyl)-γ-phenyl-propyl chloride in the form of a colourless oil having a boiling point$_{20}$=172°–175° C. 11 parts of this compound are dissolved in 50 parts of toluene and heated with 17 parts of piperidine to 130° C. under reflux for 24 hours. The piperidine hydrochloride is separated by filtration with suction, and the excess piperidine and the solvent are removed under moderate vacuum.

The further procedure corresponds to that described above in connection with the preparation of N-[4-(ethoxymethyl)-γ-phenyl-propyl]-morpholine. The N-[4-(isopropoxymethyl)-γ-phenyl-propyl]-piperidine boils at 162°–164° C. (0.6 Torr).

*Preparation of N-[4-(tertiary-butoxymethyl)-γ-phenyl-propyl]-morpholine*

15 parts of tertiary butanol are dissolved in 50 parts of toluene. 2.3 parts of finely distributed sodium are then introduced and the liquid is heated to boiling until dissolution is completed. 20 parts of 4-(chlormethyl)-γ-phenyl-propyl chloride dissolved in 20 parts of toluene are now dropwise introduced within 60 minutes into said liquid under stirring at 90° C. and stirring at 90° C. is continued for 48 hours. After cooling, the solvent and the excess of butanol are distilled off under slight vacuum and the 4-(tertiary-butoxy-methyl)-γ-phenyl-propyl chloride is extracted with ether from the residue. This chloride is a yellowish oil boiling at 226°–230° C. (13 Torr).

7 parts of this chloride are dissolved in 20 parts of toluene and heated to 125° C. under reflux with 9 parts of morpholine for 24 hours. Further processing in the manner described above in connection with the preparation of N-[4-(isopropoxymethyl) - γ - phenyl-propyl]-piperidine yields the N-[4-(tertiary butoxymethyl)-γ-phenyl-propyl]-morpholine in the form of a yellowish oil having a boiling point$_{0.6}$=198°–201° C.

*Preparation of N-[4-(benzyloxy-methyl)-γ-phenyl-propyl]-pyrrolidine*

4.6 parts of sodium are dissolved under warming in 108 parts of benzyl alcohol. Into the resulting liquid 48 parts of 4-(chloro-methyl)-γ-phenyl propyl chloride are drop-wise added at 75° C. and the reaction mixture is agitated for 6 hours at the same temperature. After cooling the reaction mixture is taken up with ether, the ether layer is washed with water and dried over calcium chloride. The ether is now allowed to evaporate and the excess of the benzyl alcohol is distilled off under water jet vacuum. The residue thus obtained is subjected to fractionation under 1.5 Torr. The 4-(benzyloxy-methyl)-γ-phenylpropyl chloride distills at 198°–200° C.

14 parts of this compound are heated with 14 parts of pyrrolidine in 25 parts of toluene to 130° C. for 24 hours. After the reaction is completed, toluene and the excess of pyrrolidine are distilled off under slight vacuum. The residue is treated with an excess of 4% hydrochloric acid and the hydrochloric acid solution is washed with ether until it becomes clear. The amine is precipitated with alkali, taken up with ether and the ether layer is dried over potassium carbonate. The ether is then evaporated and the N-[4-(benzyloxymethyl)-γ-phenyl-propyl]-pyrrolidine is subjected to fractionation. Boiling point$_{0.6}$=199°–201° C.

*Preparation of N-[4-(ethoxyethyl-oxymethyl)-γ-phenyl-propyl]-morpholine*

2.3 parts of sodium are dissolved under cooling in 90 parts of ethoxyethyl alcohol. To the resulting liquid 24 parts of 4-(chloromethyl)-γ-phenyl-propyl chloride are added and the reaction mixture is stirred at 80° C. for 8 hours. Further processing in the manner described above in connection with the preparation of N-[4-(ethoxymethyl)-γ-phenyl-propyl]-morpholine, yields 4-(ethoxy-ethyloxymethyl)-γ-phenyl-propyl chloride having a boiling point$_{0.6}$=165°–168° C.

13 parts of this chloride are heated with 17 parts of morpholine in 50 parts of toluene to 130° C. for 24 hours. Further processing in the manner described above in connection with the preparation of N-[4-ethoxymethyl) - γ - phenyl-propyl]-morpholine yields N-[4-(ethoxyethyl-oxymethyl) - γ - phenyl-propyl]-morpholine having a boiling point$_{1.5}$=225°–226° C.

*Preparation of N-[4-(n-hexoxymethyl)-γ-phenyl-propyl]-morpholine*

2.3 parts of sodium are dissolved by warming in 100 parts of n-hexanol. To this solution 24 parts of 4-(chloromethyl)-γ-phenyl-propyl chloride are added and the reaction mixture is heated under stirring to 70° C. for 6 hours. After cooling, the reaction mixture is diluted with 100 parts of ether and extracted by shaking it several times with water. The solution is dried over sodium sulfate, the ether is evaporated and the excess of the hexyl alcohol is distilled off under water jet vacuum. The residue consists of 4-(n-hexoxy-methyl)-γ-phenyl-propyl chloride and boils at 203°–204° C. (14 Torr).

11 parts of this compound are heated in 25 parts of toluene with 17 parts of morpholine under reflux to 130° C. for 24 hours. Further proceeding in the manner described above in connection with the preparation of N-[4-(isopropoxymethyl) - γ - phenyl-propyl] - piperidine yields N-[4-(n-hexoxymethyl-γ-phenyl-propyl] - morpholine having a boiling point of 200°–201° C. (0.6 Torr).

*Preparation of N-[4-(n-octoxymethyl)-γ-phenyl-propyl]-morpholine*

33 parts of n-octyl alcohol are dissolved in 50 parts of benzene and in this solution 2.3 parts of sodium are dissolved by warming. Into the resulting solution 24 parts of 4-(chloromethyl)-γ-phenyl-propyl chloride are dropwise introduced under vigorous stirring within 30 minutes and stirring is continued with heating to 80° C. for 8 hours. Further proceeding in the manner described above in connection with the preparation of N-[4-(n-hexoxymethyl)-γ-phenyl-propyl]-morpholine, yields the 4-(n-octoxymethyl)-γ-phenyl-propyl chloride having a boiling point=177°–179° C. (0.5 Torr).

15 parts of this compound are heated in 50 parts of xylene with 17 parts of morpholine under reflux to 140° C. for 24 hours. Further proceeding in the manner described above in connection with the preparation of N-[4-(isopropoxymethyl) - γ - phenyl-propyl]-piperidine, yields N-[4-(n-octoxymethyl)-γ-phenyl-propyl]-morpholine having a boiling point of 211°–213° C. (0.6 Torr).

*Preparation of N-[4-(allyloxymethyl)-γ-phenyl-propyl]-morpholine*

4.6 parts of sodium are dissolved under cooling in 116 parts of allyl alcohol and to this solution 48 parts of 4-(chloromethyl)-γ-phenyl-propyl chloride are dropwise added. The reaction mixture is then stirred at 80° C. for 7 hours. Further proceeding in the manner described above in connection with the preparation of N-[4-(ethoxymethyl)-γ-phenyl-propyl]-morpholine, yields 4-(allyloxymethyl)-γ-phenyl-propyl chloride having a boiling point$_{15}$=173°–175° C.

11 parts of this compound are heated in 50 parts of toluene with 17 parts of morpholine under reflux to 130° C. for 24 hours. Further proceeding in the manner described above in connection with the preparation of N-[4-(isopropoxymethyl)-γ-phenyl-propyl]-piperidine yields the N-[4-(allyloxymethyl)-γ-phenyl-propyl]-morpholine having a boiling point$_2$=191°–193° C.

*Preparation of N-[4-(cyclohexoxymethyl)-γ-phenyl propyl]-morpholine*

50 parts of cyclohexanol are dissolved in 50 parts of benzene and in the resulting solution 2.3 parts of sodium are dissolved by warming. To this solution 24 parts of 4-(chloromethyl)-γ-phenyl-propyl chloride are dropwise added within 30 minutes and the reaction mixture is stirred at 80° C. for 8 hours. Further proceeding in the manner described above in connection with the preparation of N-[4-benzyloxymethyl)-γ-phenyl-propyl]-pyrrolidine yields the 4-(cyclohexoxymethyl)-γ-phenyl-propyl chloride having a boiling point$_1$=188°–192° C.

10 parts of this compound are heated in 25 parts of toluene with 17 parts of morpholine under reflux to 130° C. during 24 hours. Further proceeding in the manner described above in connection with the preparation of N-[4-(isopropoxymethyl)-γ-phenyl-propyl]-piperidine, yields the N-[4-(cyclohexoxymethyl)-γ-phenyl-propyl]-morpholine having a boiling point$_{0.6}$=214°–215° C.

*Preparation of N-[4-(tetrahydrofurfuroxymethyl)-phenyl-propyl]-pyrrolidine*

102 parts of tetrahydrofurfuralcohol are mixed with 50 parts of benzene and in the resulting liquid 4.6 parts of sodium are dissolved. Into this solution 48 parts of 4-(chloromethyl)-γ-phenyl-propyl chloride are dropwise introduced under stirring and the reaction mixture is stirred at 80° C. for 12 hours. Further proceeding in the manner described above in connection with the preparation of N-[4-(tertiary butoxymethyl)-γ-phenyl-propyl]-morpholine, yields after evaporation of the ether the crude 4-(tetrahydrofurfuroxymethyl)-γ-phenyl-propyl chloride in the form of an oily residue. 49 parts of this residue are dissolved in 50 parts of toluene and heated with 36 parts of pyrrolidine to 130° C. for 24 hours. Further proceeding in the manner described above in connection with the preparation of N-[4-benzyloxymethyl)-γ-phenyl-propyl]-pyrrolidine, yields the N-[4-(tetrahydrofurfuroxymethyl)-γ-phenyl-propyl]-pyrrolidine having a boiling point$_2$=229°–231° C.

*Preparation of N-[4-(ethoxyethyloxymethyl)-β-phenyl-ethyl]-morpholine*

2.3 parts of sodium are dissolved under cooling in 45 parts of ethoxyethyl alcohol. To this solution, which has been heated to 75° C. 23 parts of 4-(chloromethyl)-β-phenylethyl chloride ared ropwise added under stirring within 60 minutes, and the reaction mixture is stirred at the same temperature for 18 hours. Further proceeding in the manner described above in connection with the preparation of N-[4-(ethoxymethyl)-γ-phenyl-propyl]-morpholine, yields the 4-(ethoxyethyloxymethyl)-β-phenyl-ethyl chloride having a boiling point$_{10}$=190°–193° C.

7 parts of this compound are heated with 17 parts of morpholine under reflux to 125° C. for 24 hours. Further proceeding in the manner described above in connection with the preparation of N-[4-(ethoxymethyl)-γ-phenyl-propyl]-morpholine, yields the N-[4-ethoxyethyloxymethyl-β-phenylethyl]-morpholine having a boiling point$_{0.6}$=221°–222° C.

*Preparation of N-[4-(phenoxymethyl)-β-phenylethyl]-morpholine*

2.3 parts of sodium are dissolved in 50 parts of methanol and to the solution 9.4 parts of phenol are added. After addition of the phenol, 23 parts of 4-(chloromethyl)-β-phenylethyl chloride are added to the solution, which is then stirred under reflux at 60° C. for 24 hours. The methyl alcohol is then distilled off and the 4-(phenoxymethyl)-β-phenylethyl chloride is extracted from the residue with ether. This compound has a boiling point of 169°–171° C. (0.5 Torr) and forms colorless crystals having a melting point of 49°–50° C. from petroleum ether. The yield amounts to 75% of the theory.

15 parts of this compound are heated with 43 parts of morpholine under reflux to 125° C. for 24 hours. After this time, the excess morpholine is distilled off and the amine formed is purified in conventional manner over its hydrochloride. The product is obtained from benzene/petroleum ether in the form of colorless crystals having a melting point of 91°–92° C. The yield amounts to about 80% of the theory.

By a similar procedure and in similar yields, other 4-(aroxymethyl)-phenyl-alcamines, e.g. the following compounds are obtained:

*Preparation of N-[4-(2-chlorophenoxymethyl)-β-phenylethyl]-morpholine*

2.3 parts of sodium are dissolved under cooling in 100 parts of isopropanol. Into this solution 13 parts of o-chlorophenol are introduced and the reaction mixture is heated to 60° C. 23 parts of 4-(chloromethyl)-β-phenylethyl chloride are now introduced into the solution dropwise under stirring within 30 minutes and the reaction mixture is stirred under reflux for a total period of 24 hours. Further proceeding in the manner described above in connection with the preparation of N-[4-(phenoxymethyl)-β-phenylethyl]-morpholine, yields the 4-(2-chlorophenoxymethyl)-β-phenylethyl chloride, which has a boiling point$_{0.4}$=187°–188° C.

18 parts of this compound are heated under reflux with 26 parts of morpholine to 125° C. for 24 hours. Further proceeding in the manner described above in connection with the preparation of N-[4-(phenoxymethyl)-β-phenylethyl]-morpholine and purification in conventional manner over its bitartrate, yields N-[4-(2-chlorophenoxymethyl)-β-phenylethyl]-morpholine in the form of colorless crystals from benzene/petroleum ether. Melting point: 99°–101° C.

*Preparation of N-[4-(phenoxymethyl)-γ-phenyl-propyl]-morpholine*

64 parts of dry sodium phenolate are dissolved in 300 parts of methyl-isobutyl-ketone by warming to 110° C. Into this solution 103 parts of 4-chloromethyl-γ-phenyl-propyl chloride are dropwise introduced under stirring and stirring is continued at this temperature for a total period of 4 hours. After cooling, the reaction mixture is washed 2–3 times with 100 parts of water and the methylisobutyl ketone is distilled off under reduced pressure. The residue is taken up in 200 parts of petroleum ether and the 4-(phenoxymethyl)-γ-phenyl-propyl chloride is caused to crystallize by cooling with ice water. The crystals are separated by filtering with suction and dried at 100° C. under vacuum (10 Torr) for 1–2 hours, After recrystallization from petroleum ether, the 4-(phenoxymethyl)-γ-phenyl-propyl chloride has a melting point of 55°–56° C.

130 parts of this compound are heated under reflux with 130 parts of morpholine to 140° C. for 24 hours. Further processing is carried out in the manner described above in connection with the preparation of N-[4-(phenoxymethyl)-β-phenylethyl]-morpholine and yields the N-[4-(phenoxymethyl)-γ-phenyl-propyl]-morpholine in the form of colorless crystals from n-heptane. Melting point: 52°–53° C.

Preparation of N-[4-(4-nitro-phenoxymethyl)-γ-phenyl-propyl]-morpholine 4.6 parts of sodium are dissolved under cooling 100 parts of methanol. To the solution 28 parts of 4-nitrophenol are added and subsequently 41 parts of 4-(chloromethyl)-γ-phenyl-propyl chloride are dropwise introduced under stirring and heating to 75° C. within 1 hour. Stirring is continued for 48 hours. The methanol is then distilled off and the residue is extracted with ether. The ether layer is repeatedly washed with 4% NaOH solution and subsequently with water and is then dried over calcium chloride. The ether is now evaporated and the residue subjected to fractionation. The 4-(4-nitro-phenoxymethyl)-γ-phenyl-propyl chloride boils at 238°–239° C. (0.6 Torr). When obtained from benzene/petroleum ether, it has a melting point of 70°–71° C.

31 parts of this compound are dissolved in 50 parts of benzene heated to 50° C. and to the solution 17 parts of morpholine in 50 parts of benzene are dropwise added under stirring. Subsequently, the reaction mixture is heated to 75° C. for 24 hours and then heated to boiling for further 24 hours. After cooling the morpholine hydrochloride is filtered off, the reaction mixture washed with water until it is free from morpholine and subsequently the N-[4-(4-nitro-phenoxymethyl)-γ-phenyl-propyl]-morpholine is extracted with 4% hydrochloric acid. The hydrochloric acid solution is mixed with ammonia in excess, the amine extracted with ether and the ether layer dried over potassium carbonate. After evaporation of the ether, the desired amine is obtained in the form of colorless crystals. After recrystallization from benzene/petroleum ether, the crystals have a melting point of 90°–91° C.

Preparation of N-[4-(2-chlorophenoxymethyl)-γ-phenyl-propyl]-morpholine 4.6 parts of sodium are dissolved under cooling in 100 parts of ethanol. To the solution 26 parts of o-chlorophenol are added and the reaction mixture heated to 80° C. Into the latter 48 parts of 4-(chloromethyl)-γ-phenyl-propyl chloride are dropwise introduced under stirring and stirring is continued so that the total period of stirring at 80° C. amounts to 8 hours. Further processing is carried out in the manner described above in connection with the preparation of N-[4-(phenoxymethyl)-β-phenylethyl]-morpholine. The product thus obtained is the 4-(2-chlorophenoxymethyl)-β-phenyl-propyl chloride and has a boiling point$_{0.8}$=208°–209° C.

15 parts of this compound are heated with 17 parts of morpholine in 25 parts of toluene to 140° C. for 24 hours. The morpholine hydrochloride is separated by filtering with suction, the toluene is distilled off under vacuum and the amine formed is purified in conventional manner over the hydrochloride. The N-[4-(2-chloro-phenoxymethyl)-γ-phenyl-propyl]-morpholine boils at 229°–232° C. (0.6 Torr).

Preparation of N-[4-(4-chloro-phenoxymethyl)-γ-phenyl-propyl]-morpholine

In the manner described in the preceding example, 2.3 parts of sodium, 13 parts of 4-chlorophenol and 24 parts of 4-chloromethyl-γ-phenyl-propyl chloride are reacted in 100 parts of ethanol to form 4-(4-chloro-phenoxymethyl)-γ-phenyl-propyl chloride. After recrystallization from petroleum ether, this compound melts at 65° C.

7 parts of this compound are reacted with 17 parts of morpholine in 50 parts of toluene, in the manner described in the preceding example and thereby yield the N-[4-(4-chlorophenoxymethyl)-γ-phenyl-propyl]-morpholine, which can be obtained in the form of colorless crystals from aqueous methanol, with a melting point of 69°–70° C.

Preparation of N-[4-(2,4-dichlorophenoxymethyl)-γ-phenyl-propyl]-morpholine

The compound 4-(2,4-dichloro-phenoxymethyl)-γ-phenyl-propyl chloride having a boiling point$_{0.8}$=219°–220° C. is prepared by reacting 2.3 parts of sodium, 16 parts of 2,4-dichlorophenol and 24 parts of 4-(chloromethyl)-γ-phenyl-propyl chloride in 100 parts of methanol, in a manner analogous to that described in the above example relating to the preparation of N-[4-(2-chloro-phenoxymethyl)-γ-phenyl-propyl]-morpholine.

17 parts of the 4-(2,4-dichloro-phenoxymethyl)-γ-phenyl-propyl chloride is reacted in 30 parts of toluene with 26 parts of morpholine, this reaction and the subsequent processing being carried out in a manner analogous to that described in the above mentioned example. The resulting N-[4-(2,4-dichloro-phenoxymethyl)-γ-phenyl-propyl]-morpholine has a boiling point$_3$=285°–288° C.

Preparation of N-[4-(2-bromophenoxymethyl)-γ-phenyl-propyl]-morpholine

The compound 4-(2-bromo-phenoxymethyl)-γ-phenyl-propyl chloride having a boiling point$_{0.2}$=188°–191° C. is prepared by reacting 2.3 parts of sodium in 100 parts of methanol with 17 parts of o-bromo-phenol and 24 parts of 4-(chloromethyl)-γ-phenyl-propyl chloride, in the manner described above in the example relating to the preparation of N-[4-(2-chlorophenoxymethyl)-γ-phenyl-propyl]-morpholine.

21 parts of the 4-(2-bromo-phenoxymethyl)-γ-phenyl-propyl chloride are reacted in the manner described in said example with 43 parts of morpholine in 25 parts of toluene under heating to 125° C. for 24 hours. The amine formed is purified over the bitartrate. The N-[4-(2-bromo-phenoxymethyl)-γ-phenyl-propyl]-morpholine boils at 257°–262° C. (1 Torr).

Preparation of N-[4-(4-bromo-phenoxymethyl)-γ-phenyl-propyl]-morpholine 2.3 parts of sodium are dissolved in 100 parts of ethanol. To the solution 17 parts of p-bromo-phenol are added and into the resulting solution, which is heated to 70° C. 24 parts of 4-(chloromethyl)-γ-phenyl-propyl chloride are dropwise introduced within 30 minutes under stirring. The reaction time is 3 hours. By further proceeding in the manner described in the above example relating to the preparation of N-[4-(phenoxymethyl-β-phenylethyl]-morpholine 4-(bromo-phenoxymethyl)-γ-phenyl-propyl chloride is obtained in the form of colorless crystals from petroleum ether/benzene, with a melting point of 81° C.

8.5 parts of this compound are heated in 50 parts of toluene with 17 parts of morpholine to 140° C. for 23 hours. Further processing takes place substantially in the manner described above in the example relating to the preparation of N-[4-(2-chloro-phenoxymethyl)-γ-phenyl-propyl]-morpholine, whereby purification is effected over the bitartrate. The N-[4-(4-bromo-phenoxymethyl)-γ-phenyl-propyl]-morpholine is obtained with a melting point of 77°–78° C. from n-heptane in the form of colorless crystals.

Preparation of N-[4-(4-chloro-3-methyl-phenoxymethyl)-γ-phenyl-propyl]-morpholine By reacting 4.6 parts of sodium in 100 parts of methanol with 29 parts of 4-chloro-m-cresol and 48 parts of 4-(chloro-methyl)-γ-phenyl-propyl chloride substantially in the manner described in the above example relating to preparation of N-[4-(2-chloro-phenoxymethyl)-γ-phenyl-propyl]-morpholine, as the reaction product 4-(4-chloro-3-methyl-phenoxymethyl)-γ-phenyl-propyl chloride is formed. This compound forms colorless crystals from petroleum ether, having a melting point of 42°–43° C.

15 parts of this compound are heated in 30 parts of toluene with 17 parts of morpholine to 140° C. for 24 hours. Further processing according to the above mentioned example yields N-[4-(4-chloro-3-methyl-phenoxymethyl)-γ-phenyl-propyl]-morpholine having a boiling point$_1$=252°–253° C.

Preparation of N-[4-(2-methyl-phenoxymethyl)-γ-phenyl-propyl]-morpholine 2.3 parts of sodium are dissolved under cooling in 100 parts of methanol. To the solution 13 parts of o-cresol are added and into the mixture heated to 75° C., 24 parts of 4-(chloromethyl)-γ-phenyl-propyl chloride are slowly dropwise introduced. The reaction mixture is stirred for a total period of 17 hours. Further processing in the manner described in the above example relating to the preparation of N-[4-(phenoxymethyl)-β-(phenylethyl)-morpholine, yields 4-(2-methyl-phenoxymethyl)-γ-phenyl-propyl]-chloride having a boiling point$_{0.4}$=178°–181° C.

16 parts of this compound are heated with 17 parts of morpholine to 125° C. for 24 hours. Further processing according to the above mentioned example yields N - [4 - (2 - methyl - phenoxymethyl) - γ - phenyl-propyl]-morpholine having a boiling point$_{0.2}$=220°–223° C.

Preparation of N-[4-(3-methyl-phenoxymethyl)-γ-phenyl-propyl]-morpholine

In a procedure corresponding in every respect to that described in the preceding example, m-cresol yields 4-(3-methyl-phenoxymethyl)-γ-phenyl-propyl chloride having a boiling point$_{0.5}$=185°–189° C. By reacting this compound with morpholine in the manner described in the preceding example, N-[4-(3-methyl-phenoxymethyl)-γ - phenyl - propyl] - morpholine having a boiling point$_{0.4}$=228° C. is obtained.

Preparation of N-[4-(4-methyl-phenoxymethyl)-γ-phenyl-propyl]-morpholine

The preparation of this compound corresponds in every respect to that described in the above example relating to N-[4-(2-methyl-phenoxymethyl)-γ-phenyl-propyl]-morpholine. In preparing the compound of the present example, first 4-(4-methyl-phenoxymethyl)-γ-phenyl-propyl chloride having a boiling point$_{0.2}$=175°–177° C. is formed. The melting point of colorless crystals obtained by recrystallization from petroleum ether is 62° C. This compound is reacted with morpholine in the manner described in the above mentioned previous example, and yields N - [4-(4-methyl-phenoxymethyl)-γ-phenyl-propyl]-morpholine which forms colorless crystals from petroleum ether, having a melting point of 54° C.

Preparation of N - [4 - (3 - methoxy-phenoxymethyl)-γ-phenyl-propyl]-pyrrolidine 4.6 parts of sodium are dissolved under cooling in 100 parts of ethanol. To this solution first 25 parts of resorcin-monomethyl ether are added and then 48 parts of 4-(chloromethyl)-γ-phenyl-propyl chloride are dropwise introduced under stirring within 30 minutes. The reaction mixture is now slowly heated to 80° C. and kept at this temperature for 8 additional hours. After cooling, the sodium chloride is separated by filtering with suction, the ethyl alcohol is distilled off, the residue taken up in ether and rendered free from phenol by washing it with dilute 2% sodium hydroxide solution. The ether layer is dried over calcium chloride and then first the solvent and subsequently the byproduct consisting of 4-(ethoxymethyl)-γ-phenyl-propyl chloride is distilled off. The residue consists of the crude 4-(3-methoxy-phenoxymethyl)-γ-phenyl-propyl chloride.

48 parts of this crude product are dissolved in 50 parts of toluene and heated with 36 parts of pyrrolidine to 130° C. for 24 hours. After cooling, the excess of pyrrolidine and the toluene are distilled off under slight vacuum and the residue is purified in conventional manner over the hydrochloride. The N-[4-(3-methoxy-phenoxymethyl)-γ-phenyl-propyl]-pyrrolidine boils at 232°–235° C. (0.7 Torr).

Preparation of N - [4 - (6 - isopropyl-3-methyl-phenoxymethyl)-γ-phenyl-propyl]-morpholine 2.3 parts of sodium are dissolved in 100 parts of methanol and to this solution 15 parts of thymol are added into the solution, which is heated to 75° C., 24 parts of 4-(chloromethyl)-γ-phenyl-propyl chloride are dropwise introduced under stirring and stirring is continued for 23 additional hours. Further processing carried out in the manner described in the above example relating to the preparation of N-[4-(phenoxymethyl)-β-phenylethyl]-morpholine, yields the 4-(6-isopropyl-3-methyl-phenoxymethyl)-γ-phenyl-propyl chloride having a boiling point of 186°–187° C. (0.7 Torr).

16 parts of this compound are heated with 17.4 parts of morpholine to 125° C. for 24 hours. Further processing according to the above mentioned previous example yields the N-[4-(6-isopropyl-3-methyl-phenoxymethyl)-γ-phenyl-propyl]-morpholine having a boiling point$_{0.2}$=221°–223° C.

Preparation of N-[4-(phenoxymethyl)-γ-phenyl-propyl]-diethylamine 22 parts of 4-(phenoxymethyl)-γ-phenyl-propyl chloride prepared in the manner described in the above example relating to the preparation of N-[4-(phenoxymethyl)-γ-phenyl-propyl]-morpholine are mixed with 37 parts of anhydrous diethylamine and heated to 140° C. in a closed container for 24 hours. After cooling the excess of diethylamine is distilled off and the residue is purified in conventional manner over the hydrochloride. The resulting N-[4-(phenoxymethyl)-γ-phenyl-propyl]-diethylamine boils at 182°–184° C. (0.4 Torr).

Preparation of N-[4-(phenoxymethyl)-γ-phenyl-propyl]-methylbutylamine 13 parts of 4-(phenoxymethyl)-γ-phenyl-propyl chloride, prepared in the manner described in the above example relating to the preparation of N-[4-(phenoxymethyl)-γ-phenyl-propyl]-morpholine, are heated with 17 parts of N-methyl-(n)-butylamine to 125° C. for 48 hours. Further processing in the manner described in the above example relating to the preparation of N-[4-(phenoxymethyl)-β-phenylethyl]-morpholine, yields the N-[4-(phenoxymethyl) - γ - phenyl - propyl]-methylbutylamine having a boiling point$_{0.3}$=192°–193° C.

Preparation of N - [4-(β-naphthoxymethyl) - γ - phenyl-propyl]-morpholine 2.3 parts of sodium are dissolved in 100 parts of ethanol and to the solution 14 parts of β-naphthol are added. Into this solution, which is heated to 70° C., 24 parts of 4-(chloromethyl)-γ-phenyl-propyl chloride are dropwise introduced under stirring within 30 minutes. Stirring of the reaction mixture is continued for 14 additional hours. By further processing in the manner described in the above example relating to the preparation of N-[4 - (3 - methoxy-phenoxymethyl)-γ-phenyl-propyl]-pyrrolidine, crude 4 - (β - naphthoxymethyl)-γ-phenyl-propyl chloride is obtained as a brownish oil, 27 parts of this crude product are dissolved in 50 parts of toluene and heated with 26 parts of morpholine to 140° C. for 14 hours. Further processing is carried out in the manner described in the above example relating to the preparation of N-[4-(2-chlorophenoxymethyl)-γ-phenylpropyl]-morpholine. The resulting N - [4-(β-naphthoxymethyl) - γ - phenyl - propyl] - morpholine has a boiling point$_{0.8}$=276°–279° C.

*Preparation of N-[4-(phenoxymethyl)-δ-phenylbutyl]-morpholine*

12 parts of sodium phenolate are dissolved in 70 parts of methyl-isobutyl ketone by heating to 110° C. and into this solution 22 parts of δ-phenylbutyl chloride are dropwise introduced under stirring within 30 minutes. The reaction mixture is stirred for 4 additional hours at 110° C. and is then allowed to cool. The methyl-isobutyl ketone is distilled off under reduced pressure and the residue is extracted with ether. The ether layer is washed several times with water and is then dried over calcium chloride. After evaporation of the ether the residue is distilled under a pressure of 0.7 Torr, whereby 4-(phenoxymethyl)-δ-phenylbutyl chloride distills over at 199°–203° C.

7 parts of this compound are dissolved in 30 parts of xylene and heated with 9 parts of morpholine to boiling under reflux for 24 hours. After distilling off the excess of morpholine and the xylene, the amine formed is purified in conventional manner over its hydrochloride. The resulting N-[4-(phenoxymethyl)-δ-phenylbutyl]-morpholine is recrystallized from petroleum ether and has then a melting point of 49°–50° C.

The parts stated above are parts by weight if not otherwise stated. In some of the above statements of boiling points, the pressure, if different from one atmosphere, is indicated by a subscript. For example "B.P.$_{10}$" or "boiling point$_{10}$" means the boiling point at a pressure of 10 mm. of mercury. The term "Torr" is a unit of pressure equal to 1/760 of one normal atmospheric pressure.

It will be understood that the present invention is not limited to the specific materials, proportions, solvents, conditions and other details specifically described above and can be carried out with various modifications. For example, in addition to the amines specifically described other suitable amines and instead of the sodium alcoholates and phenolates their equivalents, e.g. potassium alcoholates and potassium phenolates can be used. These and other modifications can be made without departing from the scope of the invention as defined in the appended claims.

What is claimed is:

1. A new compound corresponding to the general formula

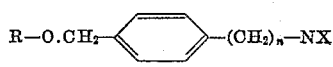

wherein R stands for a radical selected from the group consisting of ethyl, isopropyl, t-butyl, allyl, ethoxyethyl, benzyl, phenyl, cresyl radicals and radicals of hexanol, octylalcohol, cyclohexanol, tetrahydrofurfuryl alcohol, monochlorophenol, monobromophenol, dichlorophenol, mononitrophenol, monochloro-cresol, beta-naphthol, resorcinmonomethyl ether and 3-hydroxy-4-isopropyl toluene; n is an integer in the range of 2–4 and —NX is an amino radical selected from the group consisting of morpholine, piperidine, pyrrolidine, diethylamine, and methylbutylamine radicals.

2. As a new compound, N-[4-(ethoxymethyl)-γ-phenylpropyl]-morpholine.

3. As a new compound, N-[4-isopropyloxymethyl)-γ-phenylpropyl]-piperidine.

4. As a new compound, N-[4-(ethoxyethyloxymethyl)-γ-phenylpropyl]-morpholine.

5. As a new compound, N-[4-(phenoxymethyl)-γ-phenylpropyl]-morpholine.

6. As a new compound, N-[4-(phenoxymethyl)-δ-phenylbutyl]-morpholine.

7. A process for preparing a compound corresponding to the general formula

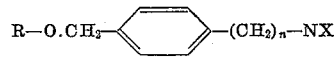

wherein R stands for a radical selected from the group consisting of ethyl, isopropyl, t-butyl, allyl, ethoxyethyl, benzyl, phenyl, cresyl radicals and radicals of hexanol, octylalcohol, cyclohexanol, tetrahydrofurfuryl alcohol, monochlorophenol, monobromophenol, dichlorophenol, mononitrophenol, monochloro-cresol, beta-naphthol, resorcinmonomethyl ether and 3-hydroxy-4-isopropyl toluene; n is an integer in the range of 2–4 and —NX is an amino radical selected from the group consisting of morpholine, piperidine, pyrrolidine, diethylamine, and methylbutylamine radicals, comprising heating a chloromethylphenyl alkyl chloride of the formula

wherein n has the meaning defined above, with a substance selected from the group consisting of alkali alcoholates and alkali phenolates, in order to react it with the Cl atom of the chloromethyl group and heating the resulting product with an amine in order to replace the second Cl atom by the amine radical.

References Cited in the file of this patent

UNITED STATES PATENTS 1,793,176     Klarer     Feb. 17, 1931

OTHER REFERENCES

Kindler et al.: Archiv der Pharmazie und Berichte der deutschen pharmazertischen Gesellschaft, vol. 283, pp. 184–190 (1950), abstracted in Chemical Abstracts, vol. 45, cols. 1970–1971 (1951).